United States Patent [19]
Yanatori

[11] Patent Number: 4,924,256
[45] Date of Patent: May 8, 1990

[54] SLIT EXPOSURE TYPE COLOR IMAGE FORMING APPARATUS

[75] Inventor: Hiromi Yanatori, Hachioji, Japan

[73] Assignee: Konishiroku Photo Industry Co. Ltd., Tokyo, Japan

[21] Appl. No.: 188,710

[22] Filed: May 4, 1988

Related U.S. Application Data

[63] Continuation of Ser. No. 886,570, Jul. 16, 1986, abandoned.

[30] Foreign Application Priority Data

Jul. 19, 1985 [JP] Japan .................. 60-160831
Jul. 19, 1985 [JP] Japan .................. 60-160832

[51] Int. Cl.$^5$ .......................................... G03B 29/00
[52] U.S. Cl. ................................ 355/28; 355/29; 355/310
[58] Field of Search .............. 355/3 R, 13, 27, 28, 355/29, 309, 310

[56] References Cited
U.S. PATENT DOCUMENTS

| | | | |
|---|---|---|---|
| 3,452,627 | 7/1969 | Goodman et al. | 355/28 X |
| 3,537,787 | 11/1970 | Murgas et al. | 355/29 |
| 3,637,304 | 1/1972 | Tiger et al. | 355/27 X |
| 3,665,486 | 5/1972 | Sato | 355/13 X |
| 3,682,543 | 8/1972 | Iwamoto | 355/13 |
| 3,684,372 | 8/1972 | Limberger | 355/27 X |
| 3,815,990 | 6/1974 | Newcomb et al. | 355/13 |
| 4,260,234 | 4/1981 | Burton | 355/28 X |
| 4,576,469 | 3/1986 | Shiga et al. | 355/29 |

Primary Examiner—Fred L. Braun
Attorney, Agent, or Firm—Bierman and Muserlian

[57] ABSTRACT

A slit exposure type color image forming apparatus having a first conveying device for transferring a photosensitive material to an exposure position, a second conveying device for transferring the photosensitive material from the exposure position to another position, an exposure unit adapted to expose an image on a silver halide photosensitive material while transporting the photosensitive material by the second conveying device, and a processor adapted to form a visible image on the photosensitive material. The image on the photosensitive material exposed on the basis of a signal from a detecting member, which is adapted to detect the passage of the photosensitive material. The first conveying device is released from the photosensitive material clamping force while the material is being exposed.

8 Claims, 4 Drawing Sheets

SLIT EXPOSURE TYPE COLOR IMAGE FORMING APPARATUS

This application is a continuation of application Ser. No. 886,570, filed July 16, 1986, now abandoned.

BACKGROUND OF THE INVENTION:

1. Field of the Invention:

This invention relates to a slit exposure type color image forming apparatus having a transfer means capable of improving the transfer characteristics of a photosensitive material, so as to stabilize the formation of an image in such an apparatus.

2. Description of the Prior Art:

The typical conventional methods of and apparatuses for obtaining copies of documents and drawings include the following. First, an apparatus utilizing the electrophotography is made to be of extremely small dimensions, and has a capability of obtaining monochromatic copies with a high efficiency. However, in order to reproduce a color original, it is necessary to expose it by using blue, green and red color separation filters, develop a latent image, which is formed on a photosensitive member, by using color toners, such as yellow, magenta and cyan, and thereby transfer different color portions of the image on the original to the same recording paper repeatedly by the same steps. This causes the dimensions of the apparatus to increase greatly, and makes it necessary that the apparatus has a high operation-repeating accuracy. Moreover, in this apparatus, the staggering of colors occurs, and a clear image of a high quality can rarely be reproduced.

A photosensitive material consisting of silver halide is superior to other photosensitive materials with respect to the photographic properties including the gradation and color reproducibility. The copiers using such a photosensitive materials have been made public and sold by the Ciba Gigy, Inc. and Kis France, Inc.

A copier utilizing a photosensitive material consisting of silver halide employs a total exposure system in which the exposure is done collectively at once. Accordingly, the space occupied by an optical system becomes large, and the dimensions of the copier as a whole increases greatly, so that the space in which the copier is to be installed also increases. A large light source capable of applying light uniformly to an object is also required, and it is very difficult to obtain a means for maintaining the whole surface of a photosensitive material in a horizontal state.

In the copier disclosed in Japanese Patent Laid-Open No. 204042/1984, the whole of the surface to be printed of a fixed photosensitive material is scanned with an image-exposing beam, and an exposure device having complicated construction and large dimensions is employed as in a copier in which the whole surface of a photosensitive material is exposed simultaneously. In the copier disclosed in this publication, keeping the surface of the photosensitive material horizontal is also difficult.

With a view to solving these problems, miniaturizing a copier as a whole by reducing the sizes of an optical exposure system in a scanning type exposure device used therein may be thought of.

In the scanning exposure, in other words, slit exposure, the exposure of an image is done through a slit of a narrow width. Therefore, when the moving speed of a photosensitive material in an exposure position varies, variations in exposure, i.e. variations in the image density occur, so that a belt-like different-density portion, which extends in the lengthwise direction of the slit, appears in a final image.

These inconveniences occur markedly, especially, in a copier using a photosensitive material which has excellent image reproducibility, such as a photosensitive material of silver halide, and which is capable of reproducing even the images of finely different intermediate gradations.

In all of the above-described conventional color copiers using a photosensitive material of silver halide, a photosensitive material is placed fixedly to carry out the exposure of an image. Therefore, a large space is required for installing an optical exposure system therein, and the dimensions of the copiers become large.

Moreover, it is difficult to set a photosensitive material of a large area, such as a photosensitive material of B-4 size and A-3 size on an image-forming surface with a high accuracy, and design a means for transferring a photosensitive material to an exposure stage, an exposure stage itself and a means for transferring the photosensitive material from the exposure stage to another position.

SUMMARY OF THE INVENTION:

An object of the present invention is to provide a slit exposure type color image forming apparatus free from the problems in these prior art apparatuses of this kind, having small dimensions and capable of forming a clear color-copied image on a large-sized photosensitive material.

Another object of the present invention is to present a slit exposure type color image forming apparatus free from the problems in the prior art apparatuses of this kind, having small dimensions and capable of obtaining a high-quality copied image having a uniform density.

The above objects can be achieved by a slit exposure type color image forming apparatus having a first transfer means for clamping a photosensitive material and transferring the same to an exposure position, and a second transfer means for transferring the photosensitive material from the exposure position to another position, characterized in that the photosensitive material is released from the clamping force of the first transfer means while a part or the whole of the photosensitive material is subjected to the image exposure on the basis of a signal from a means for detecting the passage of the photosensitive material.

The above objects can also be achieved by a slit exposure type color image forming apparatus consisting of an exposure device adapted to expose an image on a photosensitive material of silver halide while moving the photosensitive material at a first transfer speed, a processor adapted to form a visible image while moving the photosensitive material at a second transfer speed which is lower than the first transfer speed, and a photosensitive material-reserving zone provided between the exposure device and processor.

Other objects and characteristics of the present invention will become apparent from the following description of the embodiments taken in conjunction with the drawings.

DESCRIPTION OF THE PREFERRED EMBODIMENTS:

The embodiments of the present invention will now be described in detail. The present invention is not limited to these modes of embodiments.

Figure 1:
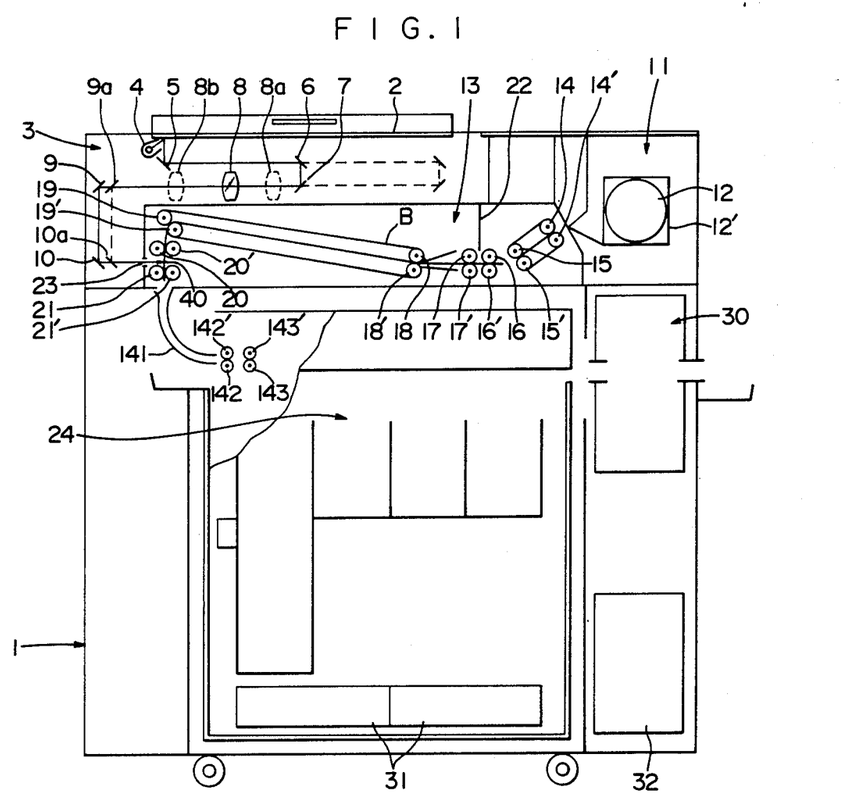
FIG. 1 is a schematic section of a first embodiment of the slit exposure type color image forming apparatus according to the present invention.

FIG. 1 is a schematic section of an embodiment of the slit exposure type color image forming apparatus used to practice the slit exposure type color image forming method according to the present invention.

A body 1 of a copied image forming apparatus consists of an image exposing means 3, a paper feed means 11, a transfer portion 13, a photographic processor 24, and a drier 30. The image exposing means 3 and transfer Portion 13 are constructed independently, and can be opened and closed, respectively.

The image exposing means 3 consists of a light source 4, a first scanning mirror 5, a second scanning mirror 6, a third scanning mirror 7, a lens 8, a fourth fixed mirror 9 and a fifth fixed mirror 10. The light source 4 is provided with a slit. Especially, a light source having no unevenness of distribution of light in the axial direction thereof is preferably used. In this embodiment, a rod type halogen lamp (200 W) having a slit width of 10 mm is used, and the light-emitting wall of this lamp is formed of frosted glass for preventing the unevenness of distribution of light.

The light source 4 and first scanning mirror 5 are moved together in parallel with the surface of an original as the light is applied to the original. The second and third scanning mirrors 6, 7 are moved in the same direction as the first scanning mirror 5 and at a speed which is a half of that of the first scanning mirror 5, so as to maintain the length of an optical path.

The light source 4 and first scanning mirror 5, and the second and third scanning mirrors 6, 7 and photosensitive material transfer rollers 20, 20', 21, 21', which will be described later, are synchronously operated. The synchronous operations of these parts can be carried out by a known synchronizing mechanism which is used widely for electrophotographic copiers.

An original (not shown in the drawing) to be copied, which is placed on a transparent document glass plate 2 is slit-exposed by the light source 4. With the scanning movement of the light source 4, the reflected light, i.e. an optical image from the surface of the original is transmitted continuously to the upper surface of a photosensitive material of silver halide (which will hereinafter be referred to as photosensitive material) 12, which is moved synchronously with the scanning movement of the light source 4, via the first scanning mirror 5, second scanning mirror 6, third scanning mirror 7, lens 8, fourth fixed mirror 9, fifth fixed mirror 10 and exposure unit 23. In this embodiment, the scanning speed of the light source 4 is 60 mm/sec.

This apparatus is capable of copying an original at various magnifications Namely, when the lens 8 and fourth and fifth fixed mirrors 9, 10 are in the positions shown by solid lines, the life size copying can be done. When the lens 8 is in a position 8a, the copying can be done on an enlarged scale, and, when the lens 8 is in a position 8b, the copying can be done on a reduced scale.

The fourth and fifth fixed mirrors are moved together to a position 9a shown in the broken lines, for correcting the deviation of an image forming position, which occurs while the lens 8 is moved to the above-mentioned position. Thus, an optical image corresponding to the image of the original is formed on the upper surface of the photosensitive material 12.

The photosensitive material 12 is formed in a rolled state, and held in a blind box 12'. The blind box 12' is fixed detachably to the apparatus body. When the blind box 12' is loaded on the apparatus, the photographic paper is drawn out a little from the blind box so that this drawn-out portion of the photographic paper is clamped between paper feed rolls (not shown in the drawing) when the loading of the blind box on the apparatus body has been completed. When a paper feeding operation is then started, the photosensitive material 12 drawn out from the blind box 12' is transferred in the transfer portion 13 by the series of pairs of rollers 14, 14' through 21, 21' which are rotated in a pressure-contacting state. The photosensitive material 12, which are stored in a rolled state, is then cut to desired sizes by a cutting member 22 provided in the transfer passage for the photosensitive material. Accordingly, the photosensitive material 12 is transferred in the form of a straightened sheet after it has been cut. Various types of members may be used as the cutting member 22, which include, for example, a cutting member adapted to cut the photosensitive material 12 while moving the blade thereof on the surface of the photosensitive material 12 in the width-wise direction thereof, and a cutting member adapted to cut the photosensitive material 12 at the same time by the blade thereof which is moved as it is kept horizontal to the surface of the photosensitive material. However, the cutting member is not specially limited. Any member may be used if it is capable of cutting the photosensitive material 12. A straightened sheet type photosensitive material may, of course, be used, instead of a roll type photosensitive material, as the photosensitive material 12. When a straightened sheet type photosensitive material is used, the cutting member 22 may not be provided. The photosensitive material 12 thus cut is clamped between belts B, B' and sent a little diagonally upward. The photosensitive material 12 is turned at substantially right angles at the pair of rollers 19, 19' and then transferred downward in a substantially perpendicular direction by the pairs of rollers 20, 20'; 21, 21'. The exposure of the image is done between the rollers 20, 20' and rollers 21, 21'. These rollers 20, 20', 21, 21' are rotated at the speed equal to the moving speed of the light source 4 and first scanning mirror 5, to transfer the photosensitive material. As is clear from the above, the photosensitive material is transferred substantially in parallel with the surface of the original from the paper feed means to a position immediately before the exposure unit, in which the direction in which the photosensitive material is fed is turned substantially by 90°, and in which the photosensitive material is transferred at substantially right angles to the surface of the original. Namely, when the photosensitive material is transferred to the position of the exposure unit 23, the image is subjected to the scanning exposure.

The exposed photosensitive material 12 is then sent to a photographic processor 24, in which the photosensitive material is processed for a predetermined period of time in each processing vessel to be then sent to the drier 30, in which the photosensitive material is dried, the resultant photosensitive material being discharged to the outside of the apparatus. In this photographic processor 24, the photosensitive material is transferred at 4–10 mm/sec.

A preferable range of speed at which the photosensitive material is transferred in the exposure unit is 50–250 mm/sec.

Referring to the drawing, reference numeral 31 denotes a waste liquid storage vessel, and 32 a supplementary liquid storage vessel.

Figure 2:
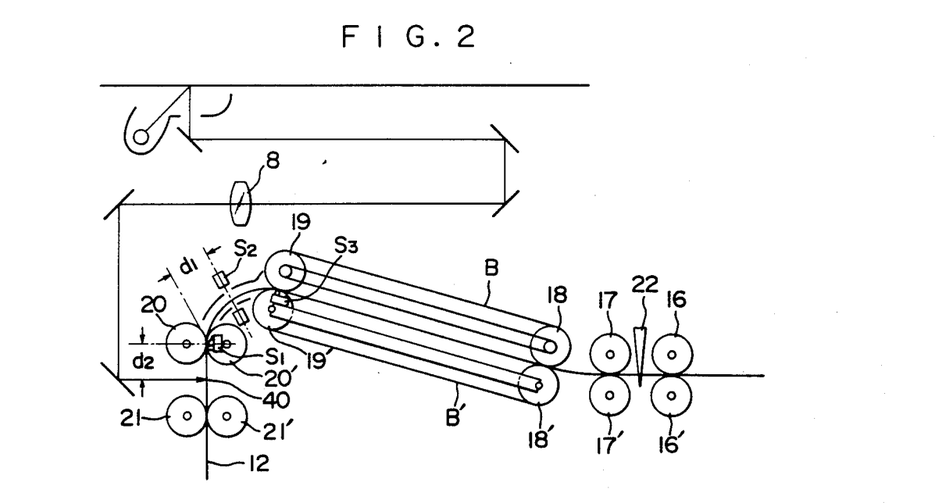
FIG. 2 is an enlarged view of a principal portion of the embodiment.

This embodiment will be described continuously with reference to FIG. 1 and FIG. 2 which is an enlarged view of a principal portion of what is shown in FIG. 1.

As described previously, when a roll type photosensitive material, which is different from an originally straightened sheet type photosensitive material, is used, the roll type web is cut to desired sizes by the cutting member 22 while the roll type web is withdrawn, and the resultant sheet type photosensitive materials are transferred sequentially toward the exposure position. This embodiment employs a system for cutting the web with the transferring of the web stopped, in order to simplify the construction of the apparatus. If a unitary transfer means is employed, a preceding cut straightened sheet type photosensitive material can be passed completely through the exposure unit but a subsequent portion of the photosensitive material cannot be withdrawn early. Namely, the transferring of a subsequent straightened sheet of photosensitive material is started considerably later than that of a preceding sheet of photosensitive material, so that the time intervals of the processing operation is prolonged. In order to prevent this inconvenience and improve the cut sheet transferring capability of the apparatus, this transfer means is divided roughly into two, i.e. a first transfer means or other conveying means which has belts B, B' wrapped in a contacting state around rollers 18, 19; 18', 19' placed on the downstream side of the cutting member, and which is adapted to transfer the photosensitive material, which is clamped between these belts B, B', toward an exposure position 40, and a second transfer means disposed on the downstream side of and separately from the first transfer means and consisting of pairs of rollers 20, 20'; 21, 21' for transferring the photosensitive material in the exposure position 40 in the forward direction.

A clamp-transfer means provided on the upstream side of the first transfer means and consisting of a transfer belt wrapped around rollers 14, 15 and a transfer belt wrapped around rollers 14', 15'; and pairs of rollers 16, 16' and 17, 17' are used as transfer members for withdrawing a web of photosensitive material from the roll thereof and sending it to the first transfer means, and these transfer members are driven at substantially the same peripheral speed.

The photosensitive material is withdrawn by a predetermined length from the roll thereof, and the portion of the photosensitive material which is to be used practically is cut with the cutting member 22. In order that the portion of the photosensitive material which is left on the upstream side after this cutting operation has been completed is not transferred, the belt wrapped around the rollers 14, 15, and the rollers 16, 17 are lifted and separated from the lower portions of the transfer means, and the transfer means on the upstream side of the first transfer means is stopped. The transfer of the photosensitive material is resumed after a predetermined period of time has elapsed.

When the cut photosensitive material clamped and transferred by the first transfer means is sent by the second transfer means, the first transfer means is released from the driving force. This is done by lifting the belt B wrapped around the rollers 18, 19, to separate the same from the belt B.

The mechanism for lifting the belt B is shown in side elevation in FIG. 3 and in perspective in FIG. 4, and will now be described additionally. A conveyor belt formed of the rollers 18, 19 and a belt wrapped therearound is set between frames 42a, 42b to make an upper transfer unit. A lift pin 43 for the upper transfer unit is provided on the frame 42 therein, the frame 42 being also provided thereon with rotary shafts 41a, 41b for the upper transfer unit.

When a solenoid 48 receives a transfer stopping signal, it is turned on to displace a movable member 47 in the direction of an arrow A, so that a lift lever 44 for the upper transfer unit is turned around its pivot 45 in the direction of an arrow C. Consequently, the pin 43 is lifted, and the upper transfer unit including the rollers 18, 19 is turned around the shafts 41a, 41b. The upper transfer unit is thus turned in the direction of an arrow D and separated completely from the lower transfer mechanism.

Conversely, when the solenoid receives a transfer resumption signal, the supply of an electric current thereto is stopped to render the movable member 47 freely movable. Consequently, the upper transfer unit is necessarily superposed on the lower transfer unit, so that the transfer means is returned to a position in which the transfer means is ready to clamp-transfer the photosensitive material.

Owing to this arrangement, the transferring of the photosensitive material in the exposure position 40 is done by the driving force of the second transfer means alone without receiving the influence of the first transfer means, and, therefore the photosensitive material can be sent at a constant speed. This can prevent the occurrence of unevenness of the density of a copied image.

The photosensitive material is transferred by the pairs of rollers 20, 20', 21, 21' in the second transfer means at a speed $\alpha v_1$ determined by synchronizing the exposure scanning speed with the scanning exposure, to be sent to the photographic processor 24. The $v_1$ in $\alpha v_1$ represents a scanning speed of the light source, and $\alpha$ a copying magnification.

The passage of the rear end of a preceding photosensitive material at the outlet of the first transfer means is detected by a detector $S_3$ to return the transfer means to a photosensitive material-transferrable state. A subsequent photosensitive material receiving this signal and cut with the cutting member 22 before or after the reception of the same signal is transferred by the first transfer means until the front end portion of the photosensitive material has reached the pairs of rollers 20, 20' in the second transfer means, at a speed of $v_2$, which is higher than $\alpha v_1$ so that the distance between the subsequent photosensitive material and the preceding photosensitive material is reduced early.

Owing to the employment of such transfer means, a sheet type photosensitive material of a predetermined length can be cut from the roll type photosensitive material, and the formation of an image on and the transferring of the sheet can be done accurately. Moreover, the processing time can be reduced, and an image forming apparatus having an improved operation efficiency can be obtained.

In the above embodiment, the first transfer means is returned to a photosensitive material-transferable state when the rear end of a preceding photosensitive material has passed the outlet of the first transfer means. There is another embodiment having more time left before the first transfer means has been returned to a photosensitive material-transferable state. In this embodiment, the passage of the rear end of a sheet at the pairs of rollers 20, 20' in the second transfer rollers is detected by a detecting means $S_1$ to return the first transfer means to a sheet-transferable state. There is still another embodiment. In this embodiment, the completion of the scanning exposure of a photosensitive material is detected, i.e., a detecting means $S_1$ or $S_2$ for this purpose is used to detect the passage of the rear end of a sheet at an exposure position, and the time $d_2/\alpha v_1$ or $(d_1+d_2)/\alpha v_1$ between a point in time at which the rear end of the sheet reaches the detecting means $S_1$ or $S_2$ and a point in time at which the rear end of the sheet reaches the exposure position is added by a timer to return the first transfer means to a sheet-transferable state. In the above formula, $d_1$ represents a distance between the detecting means $S_1$, $S_2$, and $d_2$ a distance between the exposure position 40 and detecting means $S_1$.

The examples of the means for stopping a sheet-holding operation, i.e. a sheet-transferring operation of the first transfer means include an example in which a detecting means $S_1$ is placed in the position of the pairs of rollers 20, 20' used to detect the arrival of the front end of the sheet at the rollers 20, 20' in the second transfer means, and an example in which the front end of a sheet is detected by a detecting means $S_2$, which is placed in a position spaced by a distance $d_1$ from and on the upstream side of a detecting means $S_1$, a period of time $d_1/v_2$ being then delayed by a timer, the sheet-clamping operation of the first transfer means being then stopped to interrupt the transferring of the sheet.

Another embodiment of the present invention will now be described with reference to FIG. 1 and FIG. 5 which is an enlarged view of a part of the transfer mechanism shown in FIG. 1.

A photosensitive material to be exposed is held between transfer rolls 20, 20'; 21, 21' and passes an exposure position 40 in an exposure unit at a speed of $\alpha v_1$. The image exposure is carried out in this exposure position 40, and the photosensitive material is then transferred to rollers 142, 142'; 143, 143' in a transfer unit at the inlet of a processor. In the processor, the photosensitive material being processed is transferred at a speed lower than that in the exposure position. Accordingly, the peripheral speed of the rollers 142, 142'; 143, 143' at the inlet of the processor is set slightly lower than that of the rollers 20, 20'; 21, 21' in the exposure position.

When the front end portion of the photosensitive material 12 is guided by the guide plates 144, 144' to reach the rollers 142, 142', the speed of the front end portion lowers from $\alpha v_1$ to $v_2$ but the rear end portion is driven at still a high speed $\alpha v_1$. Consequently, a swollen part occurs in the photosensitive material in the passage formed by the guide plates. If this swollen part is left as it is, the transferring of the sheet in the passage cannot be done smoothly, so that the sheet may be hurt and wrinkled. In order to eliminate this inconvenience, a guide member forming the passage is opened in the direction of an arrow in FIG. 5, in such a manner that the photosensitive material being transferred therein can be moved freely. The guide plate 144 is energized by a spring 146. While the photosensitive material being transferred is not swollen between the guide plates 144, 144', the guide plate 144 is closed as shown by a solid line in FIG. 5 but, when the photosensitive material is swollen, the guide plate 144 is opened by the swelling force thereof as shown the broken lines. In this embodiment, the solenoid shown in FIG. 3 is removed. The guide plate 144 is opened under pressure until the rear end portion of the sheet has passed between the rollers 21, 21'. After the rear end portion of the sheet has passed between the rollers 21, 21', the sheet is transferred at the lower speed $v_2$ by the rollers 142, 142'; 143, 143', so that the swollen part of the sheet disappears gradually within a predetermined period of time $t_0$. The guide plate, which has been opened, then returns to its original position to form the passage (guide chute) so that the front end portion of a subsequent photosensitive material can be transferred to a processor without trouble.

Figure 3:
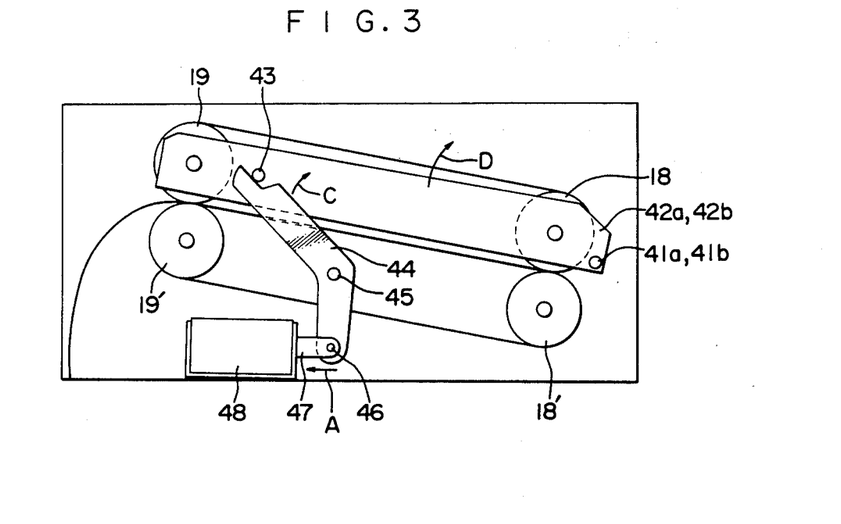
FIG. 3 is a side elevation of clamp-releasing portion of a first transfer means.
Figure 4:
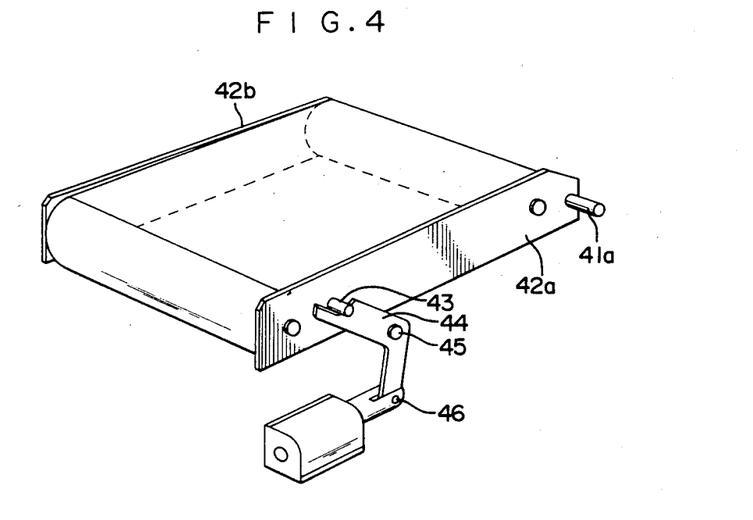
FIG. 4 is a perspective view of a lift mechanism in an upper transfer unit.
Figure 5:
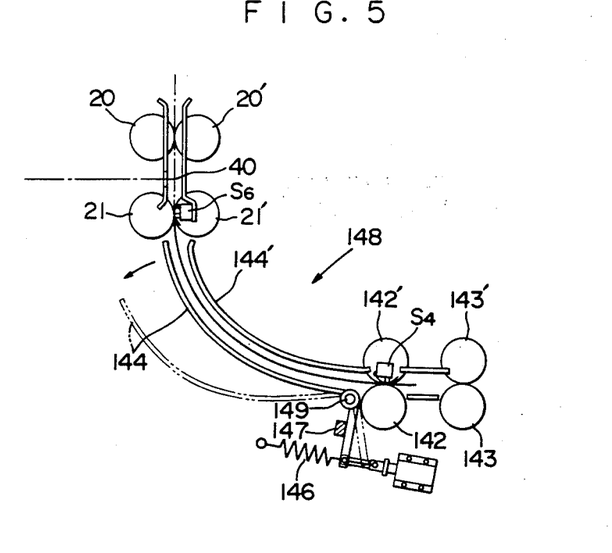
FIG. 5 is an enlarged view of a part of a transfer mechanism in another embodiment of the slit exposure type color image forming apparatus according to the present invention.

An example of a method of opening and closing the guide plate 144 is shown in FIG. 5, from which the solenoid shown in FIG. 3 is removed. This method is practiced by using a spring 146 and a stopper 147 provided as shown in FIG. 5. When the photosensitive material begins to be swollen, the swelling force thereof overcomes the resilient force of the spring 146 to open the guide plate. There is another example of such a method. Namely, as shown in FIG. 5, the passage of the front end of a photosensitive material at the rollers 142, 142' in the processor is detected by a detecting member $S_4$, and a solenoid is operated to open the guide member forcibly to a predetermined extent. A delay timer is set so as to turn off the solenoid when the time $t_0$ for eliminating a swollen part of the photosensitive material has elapsed after the passage of the rear end of the photosensitive material 12 at the rollers 21, 21' in the exposure unit has been detected by a detecting member $S_6$, and the guide member is thereby closed to form the passage again. Both of the two guide plates and guide members may be made movable, or one of the two guide plates and guide members may be made immovable with the other movable as in the embodiment of FIG. 5. In another embodiment (not shown in the drawing), in which there is little difference between the speed of a photosensitive material 12 in an exposure unit and that thereof in a processor, the photosensitive material is swollen slightly in a guide unit 148, and, therefore, the width of a space on the inner side of the guide plates is set larger to enable the space to absorb the swelling force of the photosensitive material with the guide plates left fixed.

Figure 6:
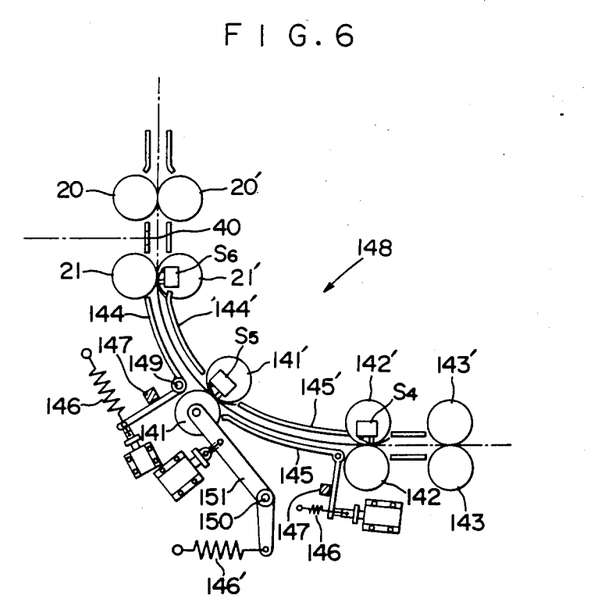
FIG. 6 shows an embodiment other than the embodiment of FIG. 5.

There is still another embodiment, in which a a transfer means is inserted into an intermediate portion of a guide unit 148 shown in FIG. 6. Namely, an intermediate pair of rollers 141, 141', the peripheral speed $v_0$ of which is substantially equal to that $\alpha v_1$ of the rollers in a transfer unit in an exposure position, i.e., in a relation $\alpha v_1 \geqq v_0 > v_2$, are provided between the transfer unit in the exposure position in an exposure unit and a transfer unit in the inlet of a processor to clamping-transfer a photosensitive material 12. While the photosensitive material is carried from the transfer unit in the exposure position to the transfer unit in the inlet of the processor, the photosensitive material is pushing-transferred as it is only held between the rollers 21, 21′, until it has been held between the rollers 142, 142′. Consequently, the transfer resistance due to the curved portion of the guide members increases to cause a trouble in some cases. These intermediate rollers 141, 141′ are provided for the purpose of eliminating such an inconvenience. In this embodiment, when the front end of the photosensitive material reaches the rollers 141, 141′, the arrival is detected by a detecting member $S_5$ to open both or one of the guide members (guide plates) 144, 144′ and thereby enable the swelling of the photosensitive material to occur easily. When the front end of the photosensitive material reaches the rollers 142, 142′, a lever 151, which retains the roller 141 rotatably, is turned around the center 150 of its swing movement by a solenoid, or both or one of the guide members 145, 145′ is opened by the same method as the guide members 144, 144′, so as to release the rollers 141, 141′ from the abutment by force applied thereto.

After the passage of the rear end of the photosensitive material at the rollers 21, 21′ has been detected by a detecting member $S_6$ provided in the same position as these rollers, the solenoid is turned off so that the guide members 144, 144′ return to the original position after the time $t_1$ for removing the swollen part of the photosensitive material has elapsed, to form a passage again. When the rear end of the photosensitive material passes between the rollers 141, 141′, the passage is detected by a detecting member $S_5$ provided in the same position as these rollers. After the passage of the rear end between these rollers has been detected, the solenoid provided on both or one of the guide members 145, 145′ (solenoid is shown on only one of the guide members in FIG. 6) is turned off by a timer after the time $t_2$ for removing the swollen part of the photosensitive material has elapsed, so that the guide members return to the original position to form a passage again. When a system in which the guide members 145, 145′ are not opened and closed is employed, the roller 141 is released from the abutment by force as previously mentioned. In such a case, the solenoid is turned off after the rear end of the photosensitive material has been detected by the detecting member $S_5$ and after the time $t_2$ for removing the swollen part of the photosensitive material has elapsed, so as to bring the roller 141 into pressure contact with the roller 141′. As a result, the passage is formed again.

In this embodiment described above, a system in which the guide members are operated forcibly by the solenoid is employed. A system in which only the guide plate 144, spring 146 and stopper 147 are used to open the guide plate 144 in accordance with the swelling force of the photosensitive material may, of course, be employed without trouble.

The photosensitive material exposed in accurate synchronism with the operation of the exposure unit as described in the statement of each of the above embodiments is transferred stably and smoothly to the processor.

In each of the above embodiments, the transfer speed of the photosensitive material in the processor is set lower than that in the exposure unit. Accordingly, if the transfer of the photosensitive material progresses in this manner, the adjacent photosensitive materials overlap each other at a certain point in time. Therefore, when a distance having the possibility that the front end of a subsequent photosensitive material overtakes and overlaps the rear end of a preceding photosensitive material is detected during the measurement of the distance between adjacent photosensitive materials, one photosensitive web-feeding operation, one photosensitive web-cutting operation and one scan-exposing operation, which are to be carried out on the upstream side, are stopped and then restarted. Such a control operation is repeated to carry out a continuous operation of this slit exposure type color image forming apparatus.

Figure 7:
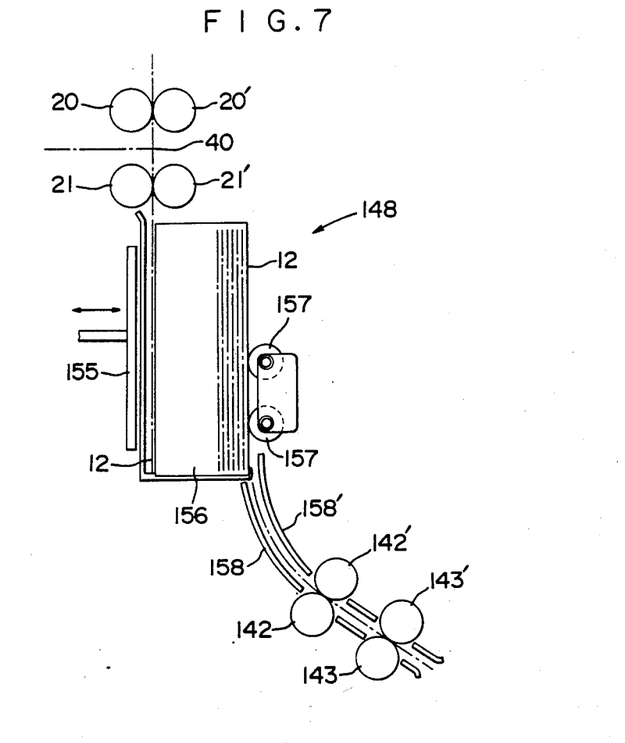
FIG. 7 shows a further embodiment using a stock case in an intermediate portion of a transfer mechanism.

An embodiment using a means different from this system will now be described with reference to FIG. 7.

In this embodiment, a photosensitive material 12 introduced by rollers 20, 20′; 21, 21′ in an exposure unit onto a transfer guide 154 is stored by a pusher 155 in a stock case 156. The photosensitive materials are sent out one by one by feed rollers 157 with a plurality of photosensitive materials always left stored in the stock case 156, in such a manner that each photosensitive material can be transferred via a transfer guide 158 as the photosensitive material is held between the rollers 142, 142′; 143, 143′ in the processor.

Figure 8:
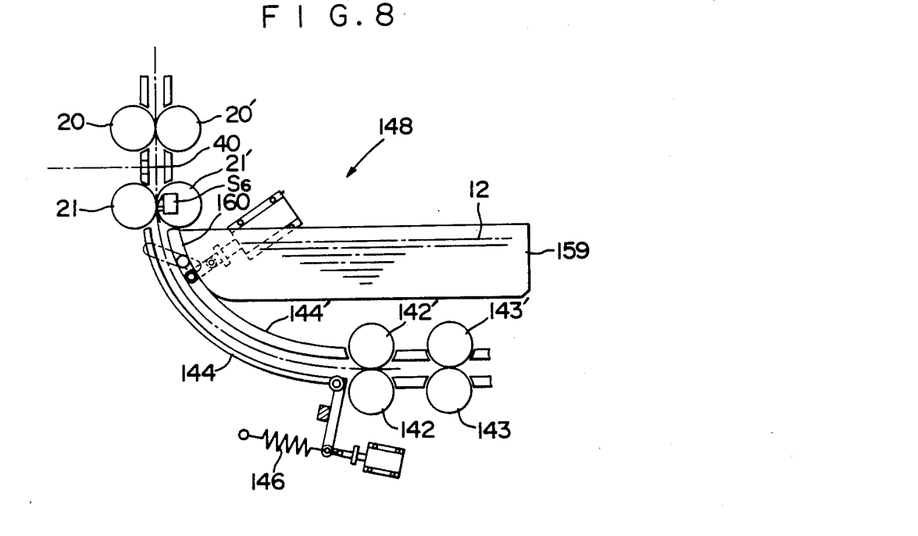
FIG. 8 illustrates an embodiment other than the embodiment of FIG. 7.

In a further embodiment, when a subsequent photosensitive material, which overtakes and nearly overlaps a preceding photosensitive material, is detected, a movable guide plate 160, which is provided at the front end portion of a guide plate 144′ so as to form a branch route as shown in FIG. 8, is turned to the position shown by a tow-dot chain line in FIG. 8. Thus, the photosensitive material 12 passing the exposure position and transferred as it is held between the rollers 20, 20′; 21, 21′ is once stored in a stock case 159. The movable guide plate 160 is then returned to its original position, and the transferring of the photosensitive material to the processor through a regular route is restarted. When a photosensitive material nearly overlapping a preceding photosensitive material is detected, the branch route is formed to place the photosensitive materials in the stock case. After these operations are repeated, the photosensitive materials stored in a suitable number in the stock case can be processed collectively in a certain position.

According to the present invention described above, a slit exposure type color image forming apparatus capable of transferring photosensitive materials, which are to be scan-exposed, accurately and synchronously, eliminating the unevenness of the density of an image, obtaining a high-quality image, and transferring photosensitive materials, which require to be scan-exposed accurately and timely, to a processor smoothly at a stably and constantly maintained scanning speed without using any complicated swollen part-eliminating means, i.e., by using a simple swollen part-eliminating means can be obtained.

What is claimed is:

1. A slit exposure type color image forming apparatus comprising an exposure portion, an exposure conveying means adapted to transport a photosensitive silver halide material through said exposure portion where said material is exposed to an optical image from an original being copied, means for processing said material downstream of said exposure portion, means for controlling said apparatus so that there are no other conveying forces applied to said material by other conveying means while said material is transported through said exposure portion, said other conveying means having a clamped position in which said material is held and said other conveying forces are applied to said material, and a free position, in which none of said other conveying forces is applied to said material, said means for controlling moving said other conveying means to said free position while said material is transported through said exposure portion.

2. The apparatus of claim 1 wherein said material is a web, said apparatus further comprising means for cutting said web of said material into sheets, said cutting means being disposed upstream of said exposure portion.

3. The apparatus of claim 2 wherein said means for cutting is upstream of said other conveying means.

4. The apparatus of claim 1 comprising a detecting means for detecting when said material is or is not being transported through said exposure portion, said detecting means signaling said means for controlling to indicate the position of said material.

5. The apparatus of claim 4 wherein said detecting means detects said material adjacent said exposure conveying means.

6. The apparatus of claim 5 wherein said means for controlling prevents application of said other conveying forces for a predetermined period of time after detection of the leading edge of said material by said detecting means.

7. The apparatus of claim 1 wherein said material comprises a serially fed plurality of sheets.

8. The apparatus of claim 1 comprising a processing conveying means for said material which receives said material from said exposure conveying means, the speed of said processing conveying means being lower than the speed of said exposure conveying means.

* * * * *